(12) United States Patent
De Poli

(10) Patent No.: US 11,919,594 B2
(45) Date of Patent: Mar. 5, 2024

(54) BICYCLE EQUIPMENT PROVIDED WITH AN ELECTRIC POWER SUPPLY UNIT

(71) Applicant: CAMPAGNOLO S.R.L., Vicenza (IT)

(72) Inventor: Luca De Poli, Galliera Veneta (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 17/953,997

(22) Filed: Sep. 27, 2022

(65) Prior Publication Data

US 2023/0093851 A1    Mar. 30, 2023

(30) Foreign Application Priority Data

Sep. 28, 2021   (IT) .................. 102021000024725

(51) Int. Cl.
   *B62J 43/30*   (2020.01)
   *B62J 43/20*   (2020.01)
   *B62M 9/122*   (2010.01)
   *B62M 9/132*   (2010.01)

(52) U.S. Cl.
   CPC ............. *B62J 43/30* (2020.02); *B62J 43/20* (2020.02); *B62M 9/122* (2013.01); *B62M 9/132* (2013.01)

(58) Field of Classification Search
   CPC ....... B62M 9/132; B62M 9/122; B62M 25/08
   USPC ..................................... 474/80, 82
   See application file for complete search history.

(56) References Cited

U.S. PATENT DOCUMENTS 5,881,823 A    3/1999   Kabatnik et al.
10,793,222 B1 *  10/2020  Harris .................. B62M 9/1244
10,981,625 B2    4/2021   Brown et al.
11,618,532 B2 *  4/2023   Jordan .................... B62L 3/02
                                                    474/80
11,697,474 B2 *  7/2023   Fujimoto ............... B62M 9/132
                                                    474/82

(Continued)

FOREIGN PATENT DOCUMENTS

EP   3002185 A1   4/2016
EP   3279074 A1   2/2018

(Continued)

OTHER PUBLICATIONS

Search Report for Italian Application No. 102021000024725 dated Jun. 10, 2022.

(Continued)

*Primary Examiner* — Henry Y Liu
(74) *Attorney, Agent, or Firm* — Steinfl+Bruno LLP

(57) ABSTRACT

An electrically powered bicycle equipment has an attachment/detachment seat for an electric power supply unit, and a latch assembly for holding the electric power supply unit in the seated state includes a slider having a head and a back. Either the electric power supply unit or the equipment has a sliding seat for the slider, the other one has a retaining seat for the head. The sliding seat accommodates the back of the slider, which has a peripheral groove and a ring gasket housed in the peripheral groove. The groove has two aligned sections and a deeper intermediate section between them. When the slider is in the fully advanced position, a gasket portion bridges the intermediate section between the two aligned sections, and when the slider moves back, the gasket portion can curve towards the bottom of the intermediate section of the peripheral groove.

15 Claims, 9 Drawing Sheets

(56) References Cited

U.S. PATENT DOCUMENTS

| | | | | |
|---|---|---|---|---|
| 2007/0037645 | A1* | 2/2007 | Ishikawa | B62M 25/08 474/70 |
| 2014/0087901 | A1* | 3/2014 | Shipman | B62M 9/1242 429/100 |
| 2014/0114538 | A1* | 4/2014 | Shipman | B62M 9/132 474/80 |
| 2014/0155204 | A1* | 6/2014 | Emura | B62M 9/135 474/80 |
| 2014/0323254 | A1* | 10/2014 | Kuwayama | B62M 9/132 474/80 |
| 2015/0111675 | A1* | 4/2015 | Shipman | B62M 9/122 474/82 |
| 2015/0353166 | A1* | 12/2015 | Kuwayama | B62M 9/135 474/82 |
| 2017/0101155 | A1* | 4/2017 | Tachibana | B62K 25/286 |
| 2017/0113759 | A1* | 4/2017 | Watarai | B62J 43/30 |
| 2017/0120983 | A1* | 5/2017 | Komatsu | B62K 25/30 |
| 2017/0197685 | A1* | 7/2017 | Braedt | B62M 9/122 |
| 2018/0001960 | A1* | 1/2018 | Pasqua | B62M 25/08 |
| 2018/0229803 | A1* | 8/2018 | Wesling | B62M 9/132 |
| 2018/0237104 | A1* | 8/2018 | Pasqua | B62M 9/125 |
| 2018/0257736 | A1* | 9/2018 | Komatsu | B62J 45/41 |
| 2018/0257737 | A1* | 9/2018 | Komatsu | B62K 25/10 |
| 2018/0274623 | A1* | 9/2018 | Brown | F16F 9/10 |
| 2019/0100279 | A1* | 4/2019 | Brown | B62M 9/127 |
| 2019/0100280 | A1* | 4/2019 | Brown | B62M 9/125 |
| 2019/0144071 | A1* | 5/2019 | Boehm | B62M 9/122 474/80 |
| 2019/0300111 | A1* | 10/2019 | Liao | B62M 9/1242 |
| 2019/0300112 | A1* | 10/2019 | Liao | B62M 9/122 |
| 2019/0351971 | A1* | 11/2019 | Dueweling | B62M 9/123 |
| 2020/0156737 | A1* | 5/2020 | Liao | B62J 43/30 |
| 2020/0189688 | A1* | 6/2020 | Rodgers | B62M 9/1242 |
| 2020/0262511 | A1* | 8/2020 | Hahn | B62M 6/50 |
| 2020/0298934 | A1* | 9/2020 | Wu | B62J 43/30 |
| 2020/0339220 | A1* | 10/2020 | Boehm | B62M 9/1242 |
| 2020/0346714 | A1* | 11/2020 | Hahn | B62J 45/414 |
| 2020/0377175 | A1* | 12/2020 | Fujimoto | B62M 9/136 |
| 2021/0061413 | A1* | 3/2021 | Ichida | B62M 25/08 |
| 2021/0129938 | A1* | 5/2021 | Sala | B62M 9/1242 |
| 2021/0129939 | A1* | 5/2021 | Sala | B62M 9/122 |
| 2021/0188393 | A1* | 6/2021 | Hahn | B62M 9/122 |
| 2022/0411017 | A1* | 12/2022 | Braedt | B62M 9/125 |
| 2023/0021733 | A1* | 1/2023 | Endo | H02J 50/10 |
| 2023/0094161 | A1* | 3/2023 | Sala | H02J 7/02 474/80 |
| 2023/0102759 | A1 | 3/2023 | Miglioranza | |

FOREIGN PATENT DOCUMENTS

| | | |
|---|---|---|
| EP | 3385154 A1 | 10/2018 |
| WO | 2021080995 A1 | 4/2021 |
| WO | 2021099208 A1 | 5/2021 |

OTHER PUBLICATIONS

Search Report for Italian Application No. 102021000024800 dated Jun. 15, 2022.

Extended European Search Report issued for EP 22197994A filed on Sep. 27, 2022 on behalf of Campagnolo S.R.L. dated Jan. 20, 2023. 11 Pages.

Extended European Search Report issued for European Patent Application No. EP22197992A filed on Sep. 27, 2022 on behalf of Campagnolo S.R.L. dated Jan. 17, 2023. 5 Pages.

* cited by examiner

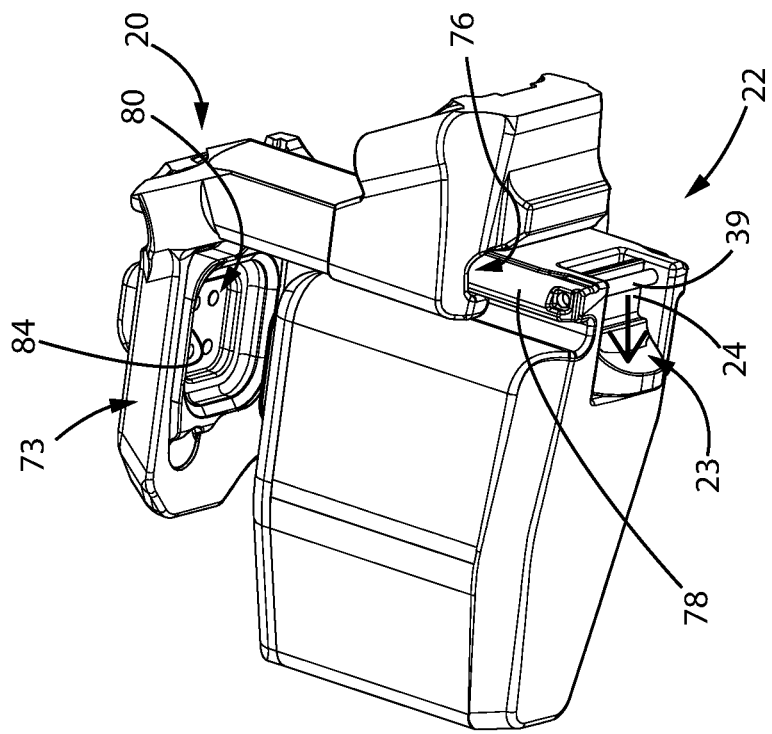
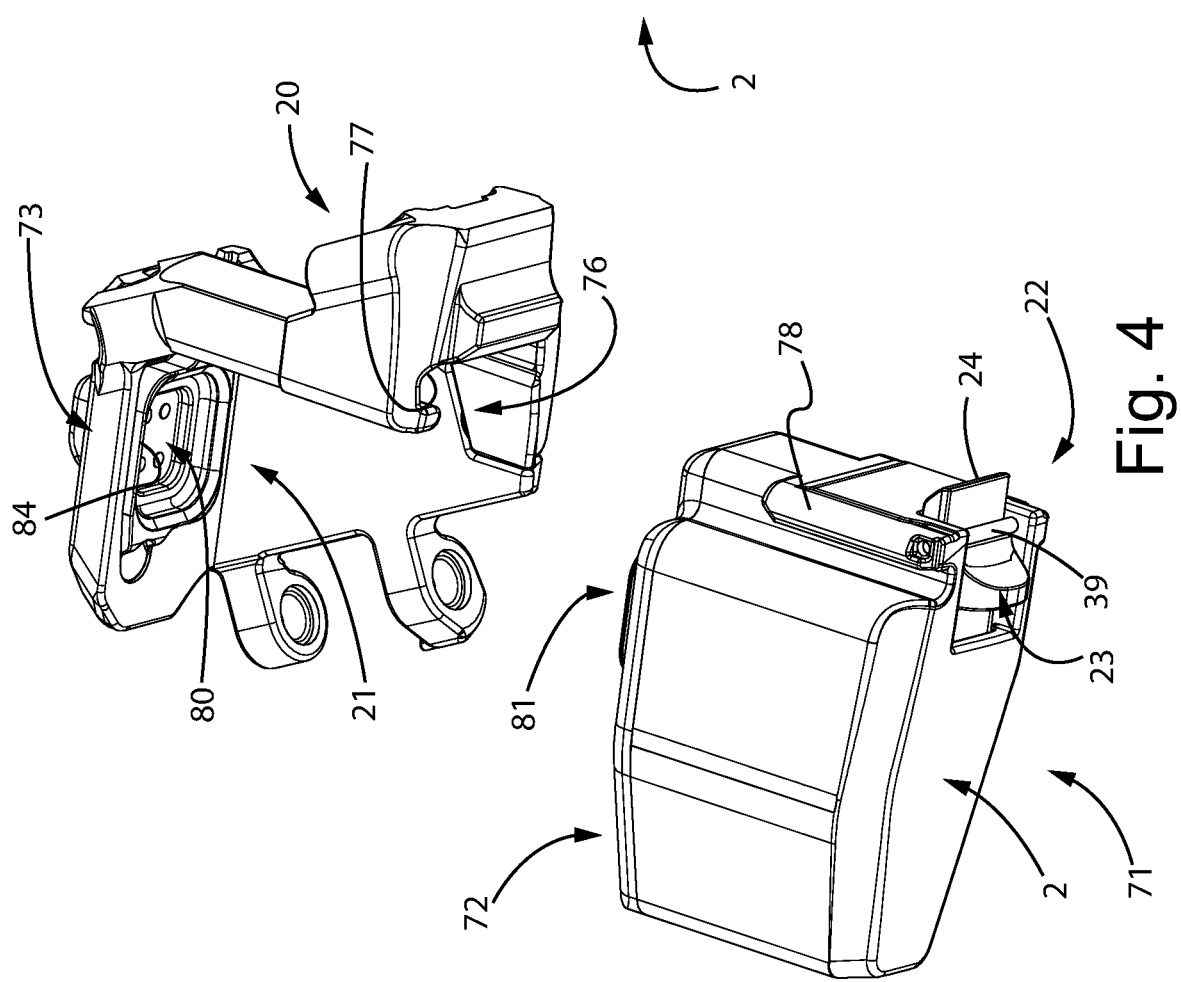
Fig. 4
Fig. 5

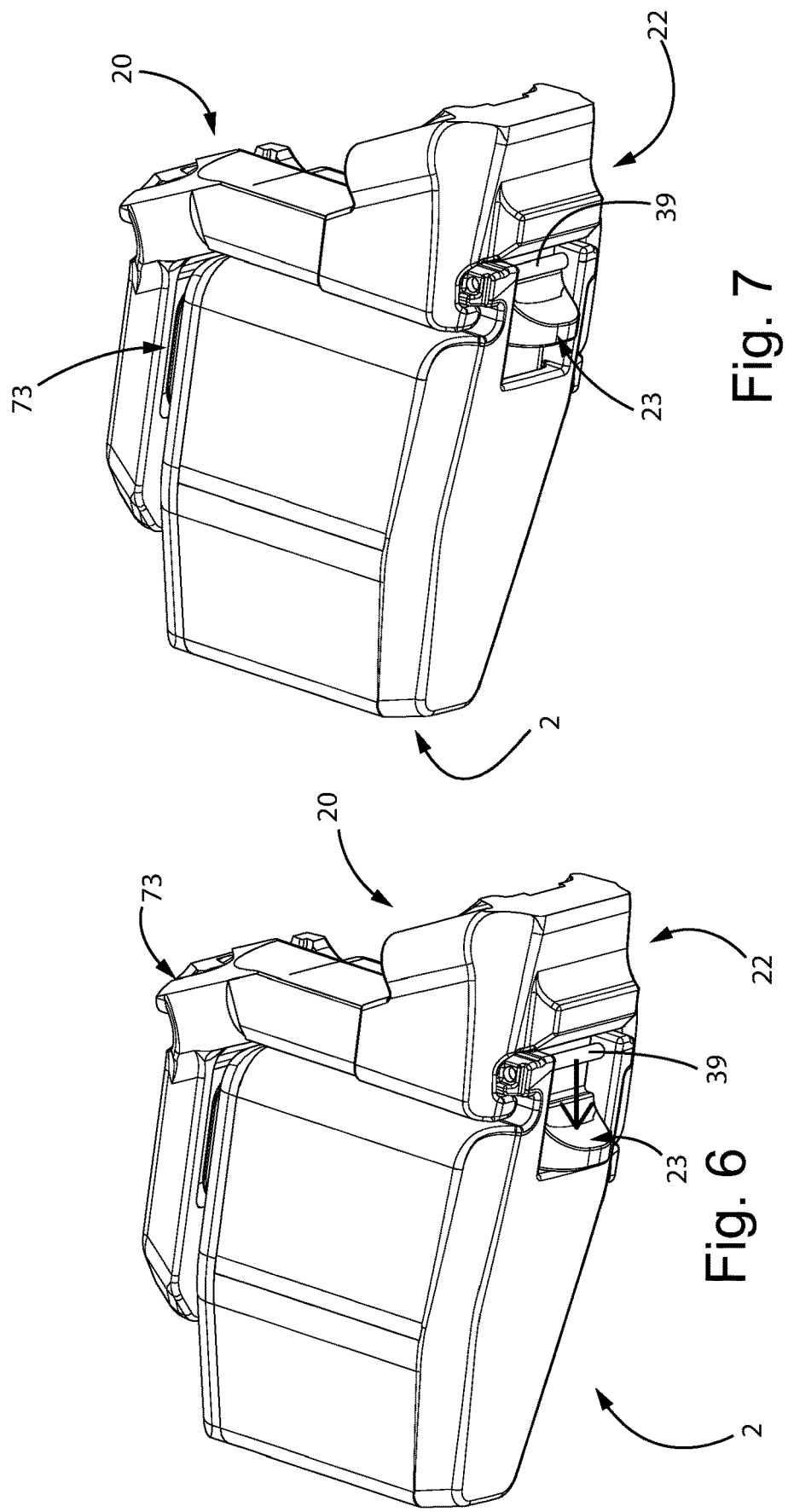

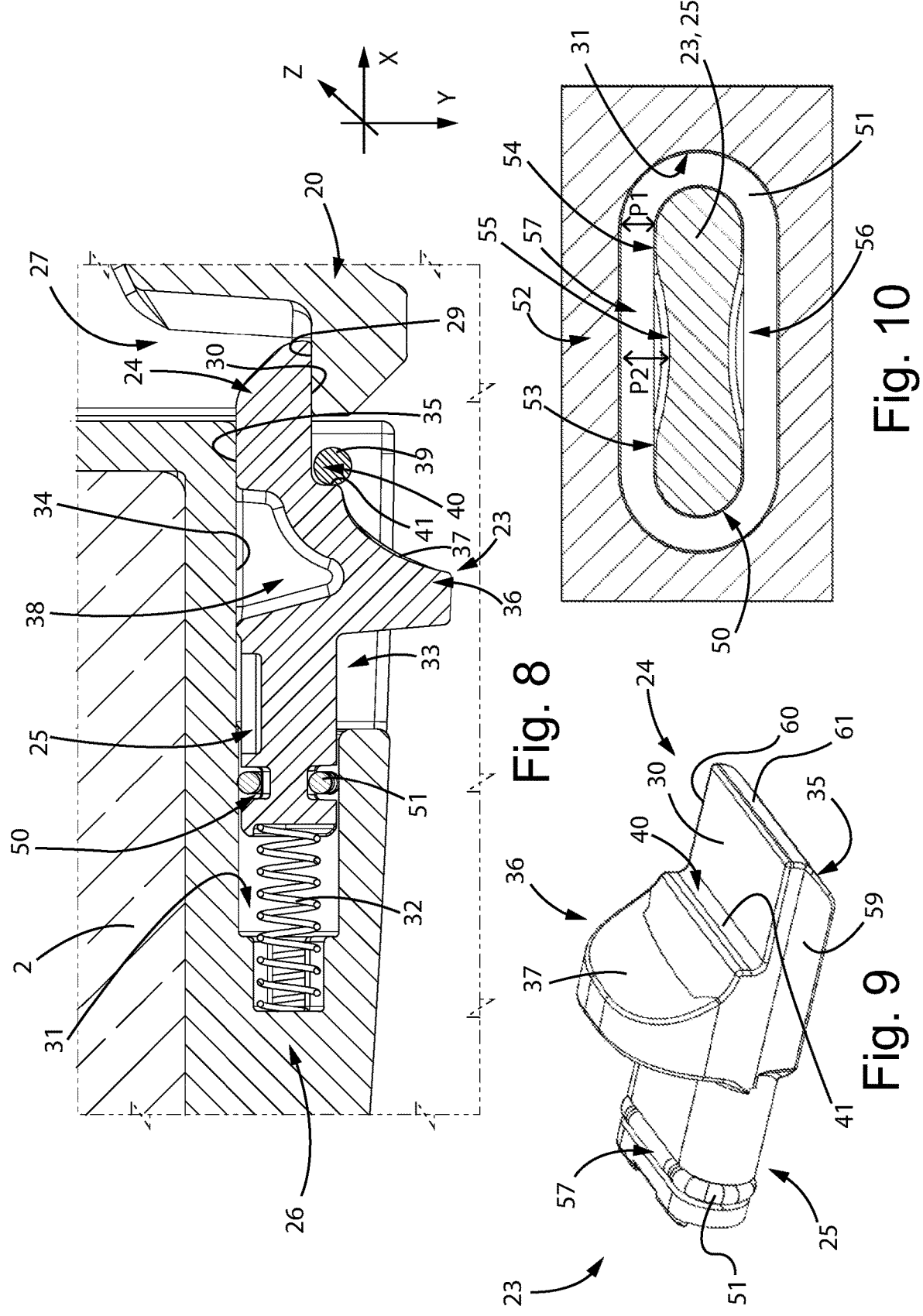

BICYCLE EQUIPMENT PROVIDED WITH AN ELECTRIC POWER SUPPLY UNIT

CROSS REFERENCE TO RELATED APPLICATIONS

This application claims the benefit of Italian Patent Application No. 102021000024725, filed on Sep. 28, 2021, which is incorporated herein by reference as if fully set forth.

FIELD OF INVENTION

The present invention relates in general to a bicycle equipment provided with an electric power supply unit.

BACKGROUND

Bicycle electric/electronic pieces of equipment which require an electric power supply unit, typically of the secondary cell battery type, comprise for example a derailleur associated with the bottom bracket spindle, a derailleur associated with the hub of the rear wheel, a suspension, a saddle setting adjuster, a lighting system, a satellite navigator, a training device, an anti-theft device, a cycle computer capable of providing information on the status of the bicycle, of the cyclist and/or of the route, a torque or power meter, a motor of a pedal assisted bicycle, a manual control device of another equipment, and others.

The technical problem at the basis of the invention is to provide a bicycle equipment with an electric power supply unit which may be attached and detached in an easy, quick and reliable manner despite the conditions of dirt and humidity to which the equipment is subject; desirably the weight and cost associated with the elements intended for removable attachment of the electric power supply unit should be contained.

SUMMARY

The disclosed electrically powered bicycle equipment comprises an electric power supply unit comprising one or more secondary cells, and a component having an attachment/detachment seat for removable attachment of the electric power supply unit. The attachment/detachment seat and the electric power supply unit have matching electric contacts that establish electrical connection in the seated state of the electric power supply unit. At least one latch assembly is provided for retaining the electric power supply unit in the seated state, and comprises a slider having a head and a back opposed to the head. One of the electric power supply unit and the component has a sliding seat of the slider, the other one of the electric power supply unit and the component has a retaining seat of the head against a displacement at least in a first way of a retaining direction, in the seated state of the electric power supply unit and in the latched condition of the latch assembly. The slider is slidable in the sliding seat between a fully advanced position wherein the head protrudes from the sliding seat in order to be able to insert in the retaining seat, and a fully retracted position wherein the head does not protrude from the sliding seat. The sliding seat comprises a blind hole, and the blind hole and the back of the slider have complementary shapes in a section transverse to the sliding direction. The blind hole is sized to accommodate the back of the slider in a sliding manner. The back of the slider has a closed-loop peripheral groove, and a ring gasket is housed taut in the peripheral groove. In at least one region of the back of the slider, the peripheral groove has two aligned sections and an intermediate section therebetween, the intermediate section being comparatively deeper than the two aligned sections. In the fully advanced position of the slider, a portion of the gasket bridges the intermediate section between the two aligned sections, and while the slider moves back, the portion of the gasket is free to curve towards the bottom of the intermediate section of the peripheral groove.

BRIEF DESCRIPTION OF THE DRAWINGS

Further features and advantages of the present invention will become clearer from the following detailed description of some preferred embodiments thereof, made with reference to the attached drawings, wherein:

FIGS. 4-7 show some steps during the movement for seating and locking the electric power supply unit on a component of the bicycle equipment of FIG. 1, in a perspective view, FIG. 8 is a cross-sectional partially cutaway view taken at the latch assembly, in the latched condition, FIG. 9 shows some members of the latch assembly in the latched condition, in a perspective view, FIG. 10 shows a cross-section across the latch assembly, in the latched condition.

DETAILED DESCRIPTION OF EMBODIMENTS

Figure 1:
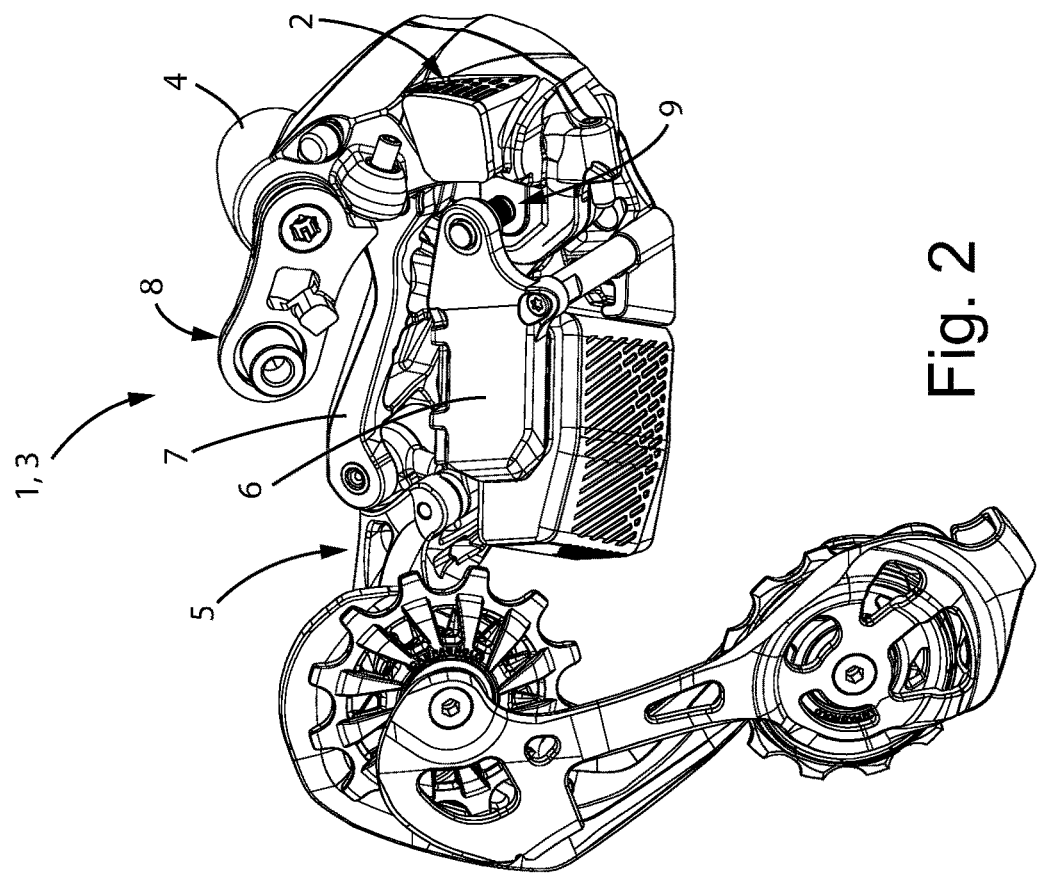
FIG. 1 is a perspective view of a bicycle equipment provided with an electric power supply unit.

In the present disclosure, under "equipment" a set of components mechanically coupled with each other and configured to be attached to the bicycle in a single location is meant to be understood. Thus, the equipment may comprise for example a derailleur or a manual control device for a derailleur attachable to the handlebars or in proximity thereto, but not the assembly of both.

In the present disclosure, expression "electric/electronic" is used to indicate an electric device that may also include electronic components and/or a data processing system.

The electric power supply unit is typically removably attached to the bicycle equipment, in order to allow recharge thereof from the mains (possibly through a recharge saddle) besides any possibility of recharging it on board of the bicycle and/or in order to allow replacement thereof in case of performance degradation.

In the present disclosure, a mechanical connection between two members is called "removable" if it allows them to be detached without the aid of tools.

In an aspect, the invention relates to an electrically powered bicycle equipment, comprising:

an electric power supply unit comprising one or more secondary cells, a component having an attachment/detachment seat for removable attachment of the electric power supply unit, the attachment/detachment seat and the electric power supply unit having matching electric contacts that establish electrical connection in the seated state of the electric power supply unit, and at least one latch assembly for retaining the electric power supply unit in the seated state, comprising a slider having a head and a back opposed to the head, one of the electric power supply unit and the component having a sliding seat of the slider, the other one of the electric power supply unit and the component having a retaining seat of the head against a displacement at least in a first way of a retaining direction, in the seated state of the electric power supply unit and in the latched condition of the latch assembly, wherein the slider is slidable in the sliding seat between a fully advanced position wherein the head protrudes from the sliding seat in order to be able to insert in the retaining seat, and a fully retracted position wherein the head does not protrude from the sliding seat, wherein the sliding seat comprises a blind hole, the blind hole and the back of the slider having complementary shapes in a section transverse to the sliding direction, and the blind hole being sized to accommodate the back of the slider in a sliding manner, wherein the back of the slider has a closed-loop peripheral groove, and wherein a ring gasket is housed taut in the peripheral groove, wherein in at least one region of the back of the slider, the peripheral groove has two aligned sections and an intermediate section therebetween, the intermediate section being comparatively deeper than the two aligned sections, whereby in the fully advanced position of the slider, a portion of the gasket bridges the intermediate section between the two aligned sections, and while the slider moves back, the portion of the gasket is free to curve towards the bottom of the intermediate section of the peripheral groove.

In the present disclosure, under "sliding" a type of clearance coupling wherein the force may not be transmitted by the coupling force alone is meant.

In the present disclosure, term "intermediate" does not imply that the portion is central and equidistant from the aligned sections.

The Applicant has recognized that the local deformation of the gasket towards the bottom of the peripheral groove, establishing a gap between the gasket and the inner wall of the blind hole of the sliding seat, counteracts the establishment of an overpressure in the blind hole itself, whereby the resistance offered by the sliding seat against the push of the slider in rearward direction (in order to open the latch and thus release the electric power supply unit or allow seating thereof) is not increased by the overpressure, thus requiring less physical effort with the finger. Furthermore, the gap acts as a vent for air from the blind hole during the push on the slider, favoring expulsion of dust particles, dirt and water possibly present in the proximity of the mouth of the blind hole of the sliding seat, hindering entry thereof in the blind hole of the seat where they could jam or in any case hinder the correct operation of the latch assembly: thus not only the gap is not detrimental for the hermetic sealing function, rather it enhances that function.

The depth of the intermediate section may be continuously variable from a maximum depth value at its center to a depth value of the two aligned sections.

The latch assembly may comprise elastic means urging the slider towards the advanced position, in particular at least one compression spring housed in the blind hole and acting by pushing on the back of the slider. In case said one or more compression springs is/are provided for, the problem of inlet of dirt and humidity in the blind hole is particularly felt.

Said at least one region of the back of the slider may also comprise two regions of the back of the slider, in particular two opposed regions.

The back of the slider may have, in cross-section, an oval shape.

In the present disclosure, under "oval shape" a rounded and slightly elongate shape is meant to be understood. More specifically, under "oval" a closed plane line enclosing a convex plane region and provided in any point with a tangent straight line that is continually variable, for example an ellipse, is meant to be understood.

When the back of the slider has an oval cross-section, said at least one region of the back of the slider is, for example, comprised in at least one longest side of the oval cross-section.

The sliding seat may further comprise a guide channel contiguous to the blind hole, the guide channel having a sliding bottom for the slider, the bottom being formed on said one of the electric power supply unit and the component. The guide channel has a longitudinal direction extending along the sliding direction.

In the present disclosure, under "contiguous", adjacent and adjoining is meant to be understood.

The slider may have a control region sliding along the guide channel.

The control region may have a finger resting surface, which may have the concavity towards the head of the slider.

In the proximity of the end of the guide channel opposed to that contiguous to the blind hole, a crosspiece may be provided for, the head of the slider being in sliding and/or rolling coupling with the crosspiece. The crosspiece is effective to hold the slider on the bottom of the guide channel.

In the present disclosure, under "crosspiece" a member extending orthogonally to the sliding direction and spaced from and parallel to the bottom of the channel is meant to be indicated.

The crosspiece may be a non-pivotable pin, with sliding friction between the crosspiece and the head, or a pin pivotable about its ow longitudinal axis, with rolling friction between pin and head.

The head of the slider may form a step with the control region of the slider, the riser of the step abutting against the crosspiece in the fully advanced position of the slider. The crosspiece then also plays the role of limiter of the slider and provides a tactile and acoustic feeling to the operator because the stop of the slider is determined by the sudden shock of the riser on the pin.

The retaining seat formed in said other one of the electric power supply unit and the component may define an abutment or limiter surface configured to receive, in abutment and pushing relationship, a surface of the head facing away from said one of the electric power supply unit and the component. In this manner the latch assembly is effective to retain the electric power supply unit against removal from the component.

The retaining seat may further define at least one second abutment surface configured to receive, in abutment and pushing relationship, another surface of the head, facing toward said one of the electric power supply unit and the component or facing laterally with respect to said one of the electric power supply unit and the component, for example the surface sliding on the bottom of the channel and/or a surface of the head not parallel to the bottom of the channel. In this manner, the retaining seat is effective to retain the electric power supply unit against movements also in other oriented directions, in particular against movements along the direction transverse to the guide channel.

The attachment/detachment seat formed on the component may be configured to retain at least one region of the electric power supply unit, substantially opposed to a region involved by the latch assembly, against removal from the component at least in a second way of the retaining direction, opposed to the first way.

Alternatively or additionally, at least one second latch assembly may be provided for in said region of the electric power supply unit substantially opposed to the region involved by the latch assembly.

The attachment/detachment seat formed on the component may comprise at least one sliding guide of the electric power supply unit along the retaining direction, and/or at least one of the electric power supply unit and the attachment/detachment seat may comprise at least one pilot member.

In the present disclosure, under "pilot member" a gradual thinning of a protrusion or a widening of a cavity wherein it has to be inserted is meant to be indicated.

In the present disclosure, term "cavity" is broadly meant to encompass a through cavity and a blind cavity or recess.

The retaining direction may be the vertical direction and the first way may be downwards in the condition wherein the bicycle equipment is mounted on the bicycle and with the bicycle in the condition of straight travel on level ground. In this manner, the electric power supply unit is held suspended by the latch assembly.

The matching electric contacts may be provided for on paired surfaces of the electric power supply unit and of the component, extending substantially orthogonal to the retaining direction.

The electric contacts of one and a same between the electric power supply unit and the component may be of the pogo pin type.

In at least one of the electric power supply unit and the component, the ground electric contact may be more outcropping than the other electric contacts.

The matching electric contacts may be arranged in a protrusion and a cavity having complementary shapes. For example, the pogo pin contacts may be arranged in a cavity so as not to protrude when the electric power supply unit is not seated.

The protrusion may have a peripheral groove, a hermetic seal gasket extending in said peripheral groove.

The bicycle equipment may be a derailleur comprising:
a plurality of mutually movable components, comprising a support body configured to be attached to a bicycle frame, a chain guide, and a pair of connecting arms extended between the support body and the chain guide, and
a geared motor controlling the mutual motion between chain guide and support body,
wherein said component having the attachment/detachment seat is a preselected component of the mutually movable components.

In the present disclosure, term "chain guide" is used to indicate the component which, overall, is moved with respect to the support body and to the connecting arms; in the case of a rear derailleur it may include a first member articulated in the articulated parallelogram, sometimes called "bottom body", and a second member movable therewith, sometimes called "rocker arm", while in the case of a front derailleur it typically comprises a single member, sometimes called "cage".

In the present disclosure, under term "geared motor", a motor not coupled with any speed reducer is meant to be encompassed.

The derailleur is, for example, a rear derailleur.

In that case, the preselected component is, for example, a connecting arm, in particular the proximal connecting arm. In such a location, the electric power supply unit turns out to be particularly protected against shocks to which it is subject during the travel of the bicycle.

Alternatively, the derailleur may be a front derailleur, the preselected component being for example the support body.

The geared motor may be housed in a second component of the plurality of mutually movable components different from the preselected component, for example in the support body when the preselected component is a connecting arm, an electric connection being provided for, extended between the contacts of the attachment/detachment seat and the second component.

Alternatively, the geared motor may be housed in the preselected component, for example geared motor and electric power supply unit may both be housed in the support body.

The derailleur may also include a data processing system, controlling the geared motor and any other electric/electronic components of the derailleur. The data processing system may comprise electric components and/or discrete electronic components and/or a micro-controller, which may also integrate memory means. The data processing system may be borne for example on at least one printed circuit board or PCB. The derailleur may thus be electronic.

Figure 2:
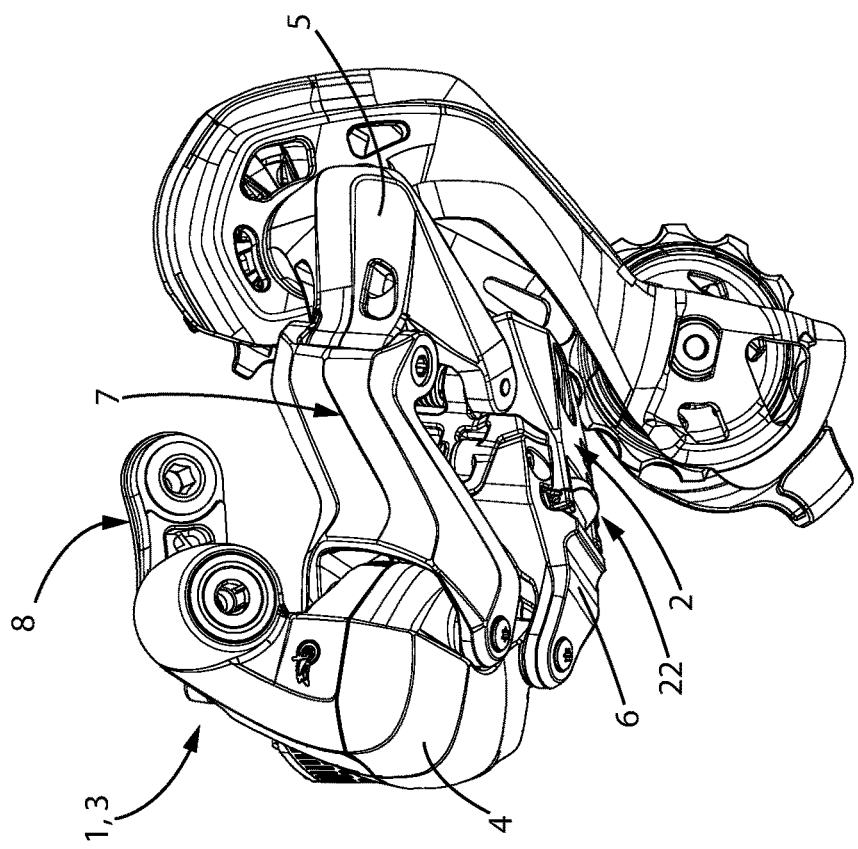
FIG. 2 is a view according to another perspective of the bicycle equipment provided with an electric power supply unit of FIG. 1.

With reference to the drawings, in FIGS. 1-2 an illustrative bicycle equipment 1 is shown, provided with an electric power supply unit 2.

In the case shown, the bicycle equipment 1 is a rear derailleur 3 comprising a support body 4 configured to be attached to a bicycle frame, a chain guide 5 and a pair of connecting arms 6, 7 extended between the support body 4 and the chain guide 5, forming a plurality of mutually movable components and in particular an articulated parallelogram. The pair of connecting arms comprises a proximal connecting arm 6 and a distal connecting arm 7. In the present disclosure, adjectives such as "proximal" and "distal" refer to the mounted condition of the derailleur on the bicycle. In particular, "proximal" is used to indicate closer to the frame and adjective "distal" is used to indicate farther from the frame.

The derailleur 3 comprises a geared motor 9. The geared motor 9 may be purely electric or electronic, when the derailleur 3 also includes a data processing system controlling the geared motor and any other electric/electronic components of the derailleur 3, for example comprising one or more components borne by one or more printed circuit boards or PCBs. As mentioned above, the geared motor may also comprise a motor not coupled with any speed reducer.

The geared motor controls the mutual motion between chain guide 5 and support body 4, in particular determines the aperture and closure of the articulated parallelogram, and therefore a displacement of the chain guide 5 having at least one displacement component in the direction of the axis of the group of toothed wheels associated with the hub of the rear wheel or "sprocket assembly", so as to bring the transmission chain or belt into engagement with a predetermined toothed wheel or sprocket of the sprocket assembly. The geared motor 9 is for example housed in the support body 4 and controls the rotation of one of the connecting arms 6, 7 (in the case shown, the proximal connecting arm 6) about a pivotal axis thereof to the support body 4. The geared motor 9 is shown directly coupled with the proximal connecting arm 6, but this is not strictly necessary. For example, the support body 4 may be attached to the frame through a connecting device so-called "articulated joint" 8.

Figure 3:
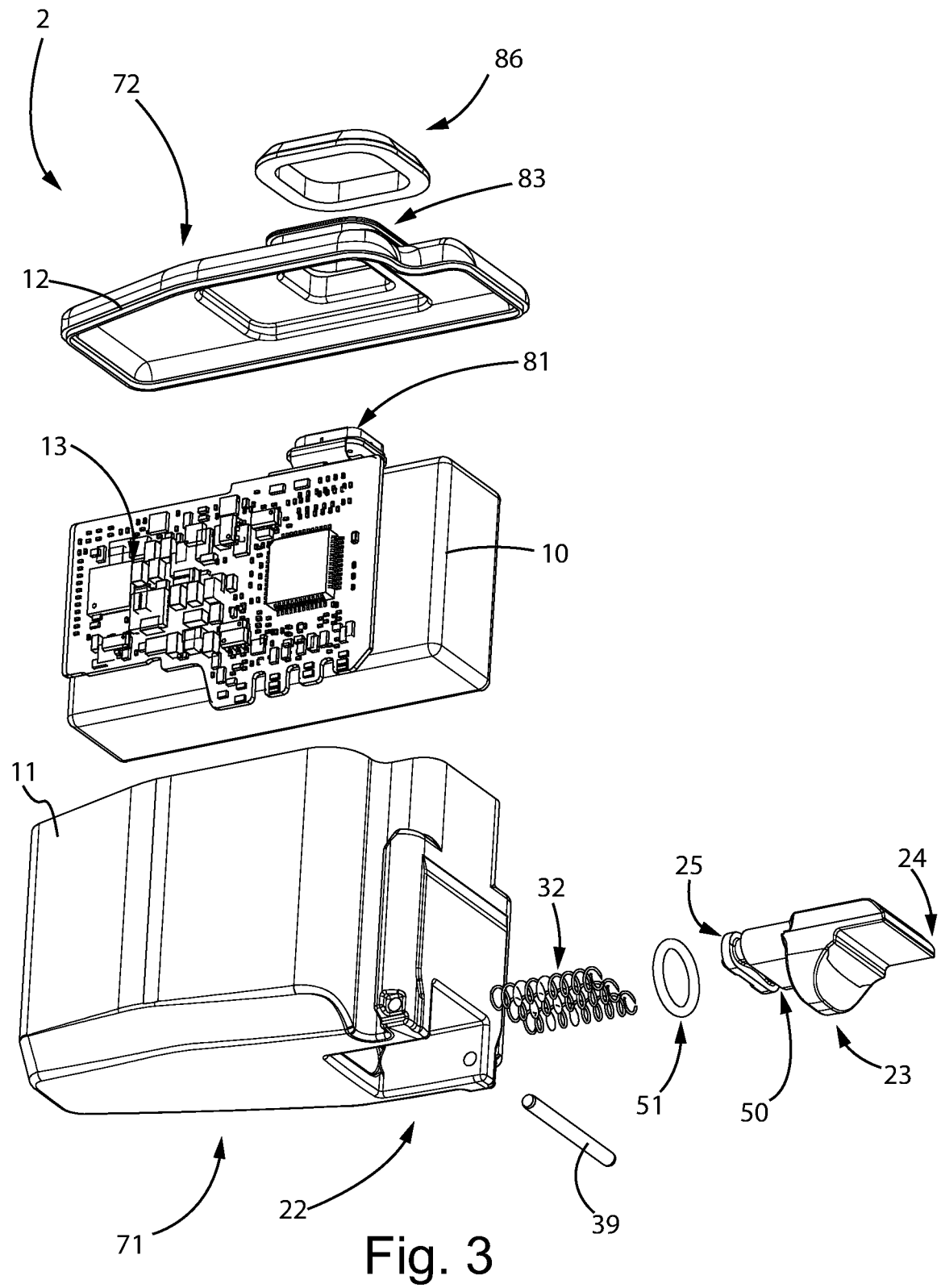
FIG. 3 is an exploded view of the electric power supply unit and of the associated components of a latch assembly for holding the electric power supply unit to the bicycle equipment.

With reference also to FIG. 3, the electric power supply unit 2 comprises one or more secondary cells 10 and a hermetic case housing said one or more secondary cells 10, formed for example by a container 11 and a cover 12. The electric power supply unit 2 may also include at least one printed circuit board or PCB 13 bearing electronic components controlling the electric power supply unit 2, housed in the hermetic case. The electric power supply unit 2 may therefore also be a so-called smart battery.

With reference also to FIGS. 4-7, the electric power supply unit 2 is removably attached to the derailleur 3, and it is shown in the detached condition in FIG. 4. To this end, a component of the derailleur 3, the proximal connecting arm 6 in the case shown, has an attachment/detachment seat 21 for the electric power supply unit 2. The component having the seat 21 for the electric power supply unit 2 is not necessarily the proximal connecting arm 6 and therefore hereinafter the component provided with the seat 21 will be referred to as component 20.

At least one latch assembly 22 for holding the electric power supply unit 2 in the seated state, on the component 20, is provided for, wherein the electric power supply unit 2 is arranged in the attachment/detachment seat 21. When the electric power supply unit 2 is seated and the latch assembly 22 is in the latched condition, the electric power supply unit 2 is firmly held on the derailleur 3 despite the vibrations and shocks to which it is subject during the bicycle travel.

With reference also to FIGS. 8-10, the latch assembly 22 first comprises a slider 23 having a head 24 and a back 25 opposed to the head 24.

In the case shown, the electric power supply unit 2 has a sliding seat 26 of the slider 23 along a sliding direction X (FIG. 8), and the component 20 has a retaining seat 27 of the head 24 against a displacement at least in a first way of a retaining direction Y (cf. the positive direction of the axis Y emphasised in FIG. 8), in the seated state of the electric power supply unit 2 and in the latched condition of the latch assembly 22.

For example, the retaining seat 27 is formed by a cavity that defines an abutment surface or limiter 29 configured to receive, in abutment and pushing relationship, a first surface 30 of the head 24. The surfaces 29, 30 are shown flat and orthogonal to the retaining direction Y, but they could deviate from such a shape.

The slider 23 slides in the sliding seat 26 between a fully advanced position (FIGS. 4, 7, 8) wherein the head 24 protrudes from the sliding seat 26 in order to be able to insert—in said seated state of the electric power supply unit 2 on the component 20—in the retaining seat 27, and a fully retracted position (FIGS. 5, 6, 11) wherein the head 24 does not protrude from the sliding seat 26—allowing the seating of the electric power supply unit 2 in the component 20 or vice versa the extraction thereof from the attachment/detachment seat 21 for removal from the component 20.

The sliding seat 26 comprises a blind hole 31. The blind hole 31 and the back 25 of the slider 23 have complementary shapes in a section transverse to the sliding direction X. The blind hole 31 is sized to receive the back 25 of the slider 23 in a sliding manner.

In the case shown, the latch assembly 22 comprises a plurality of side-by-side compression springs 32, housed in the blind hole 31 and acting by pushing on the back 25 of the slider 23, for urging the slider 23 towards the advanced position.

In the case shown, the sliding seat 26 further comprises a guide channel 33 contiguous to the blind hole 31. The bottom 34 of the guide channel 33, that provides a sliding surface for the slider 23, is formed on the electric power supply unit 2. The guide channel 33 is open outwards with respect to the electric power supply unit 2. The guide channel has a longitudinal direction extended along the sliding direction X.

The first surface 30 of the head 24 is opposed to a second surface 35 of the head 24, that is slidingly coupled on the bottom 34 of the guide channel 33.

The slider 23 has, in the case shown, a control region 36, sliding along the guide channel 33. The control region 36 may have, as shown, a finger resting surface 37 that has the concavity towards the head 24 of the slider 23.

The control region 37 may have a cavity 38 open towards the bottom 34 of the guide channel 33, for reasons of moulding and lightening.

In the proximity of the end of the guide channel 33 opposed to the one contiguous to the blind hole 31 (or head end) a crosspiece 39 is provided for, in the case shown. The crosspiece 39 extends in a transverse direction Z (FIG. 8) with respect to the sliding direction X, and is parallel to the bottom 34 of the guide channel 33, spaced therefrom. The crosspiece 39 is effective to hold the head 24 of the slider 23 on the bottom 34 of the guide channel 33. For example, the head 24 and in particular its first surface 30 may be in sliding fit with the crosspiece 39.

In the case shown, the crosspiece 39 is formed by a pin. The friction between the crosspiece 39 and the head 24 is sliding friction. The crosspiece 39 may also be formed by a pin pivotable about its own longitudinal axis, so that it turns out to be in rolling coupling with the first surface 30 of the head 24; in this manner the friction between the crosspiece 39 and the head 24 is rolling friction.

The head 24 of the slider 23 forms, in the case shown, a step 40 with the control region 36 of the slider 23, the riser 41 of the step abutting against the crosspiece 39 in the fully advanced position of the slider 23. The crosspiece 39 thus also plays the role of limiter of the slider 23 and provides a tactile and acoustic feeling to the operator because the stop of the slider 23 is determined by the sudden shock of the riser 41 on the crosspiece 39.

It is understood that in order to release the latch assembly 22, the slider 23 has to be pushed in the direction of the arrow shown in FIGS. 5 and 6, for example acting on the finger resting surface 37 of the control region 36. That pushing action has to overcome the resistance offered by the sliding seat 26, caused by the compression springs 32 if present, and in any case by the friction at play between the sliding and/or rolling coupling parts mentioned above, as well as possibly by the weight of the slider 23 itself in the case in which the sliding direction has a vertically upwards component.

The Applicant has recognized that the blind hole 31, if on the one side it protects the slider 23 and any compression springs 32 better than a through hole, is subject to the entry of dirt and humidity that may have as a consequence the jamming of the slider 23 and damaging or rusting of any compression springs 32. Furthermore, during the push of the slider 23, air is compressed by the slider 23 inside the blind hole 31, so that an overpressure establishes in the blind hole 31, tending to increase the resistance offered by the sliding seat 26, what not only increases the physical effort by the user, but also entails the risk of breaking the slider 23 or the need to make it stronger and heavier.

To the end, among others, of reducing or totally eliminating the drawbacks emphasised above, the latch assembly 22 may be configured as described hereinafter.

The back 25 of the slider 23 has a closed-loop peripheral groove 50 or peripheral throat (FIG. 3) (namely that runs all around the outer surface of the back 25). A ring gasket 51, for example an O-ring, is housed in the peripheral groove 50.

Figure 13:
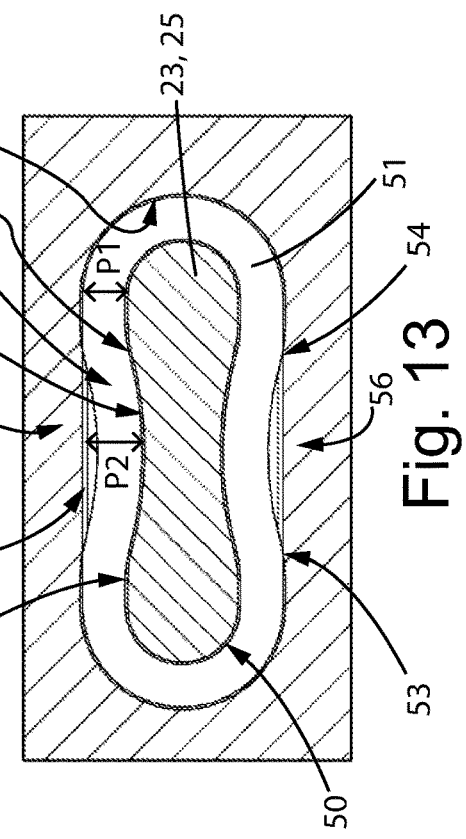

The groove 50 does not have a constant depth along its extension, as evident in FIGS. 10 and 13. In detail, in a region 52 of the back 25 of the slider 23, the groove 50 has two aligned shallow portions 53, 54 and a deeper portion 55 intermediate therebetween. The depth of the portion 55 may be continually variable from a maximum depth value P2 at the centre to the depth value P1 of the two aligned sections 53, 54 as shown, but this is not strictly necessary. In the case shown, the portion 55 is formed by a recess in the groove 50 substantially rounded and symmetric (considered in the cross-section of the slider 23), but this is not strictly necessary.

In the case shown, the back 25 of the slider 23, as well as the inner wall of the blind hole 31 wherein it slides, has, in cross-section, an oval and in particular elliptical shape. In the case shown, the region 52 is comprised in a longest side of the oval/elliptical section, but this is not necessary. The shape of the slider 23 may also be polygonal (for example square) with rounded edges or even substantially circular.

Figure 14:
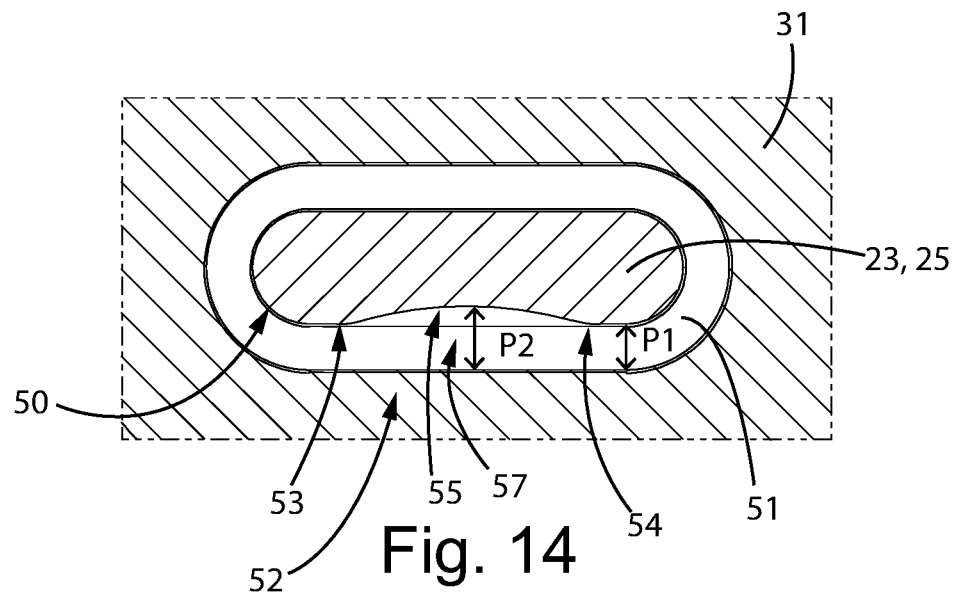
FIG. 14-15 are views corresponding to FIGS. 10 and 13, with a modified latch assembly.
Figure 15:
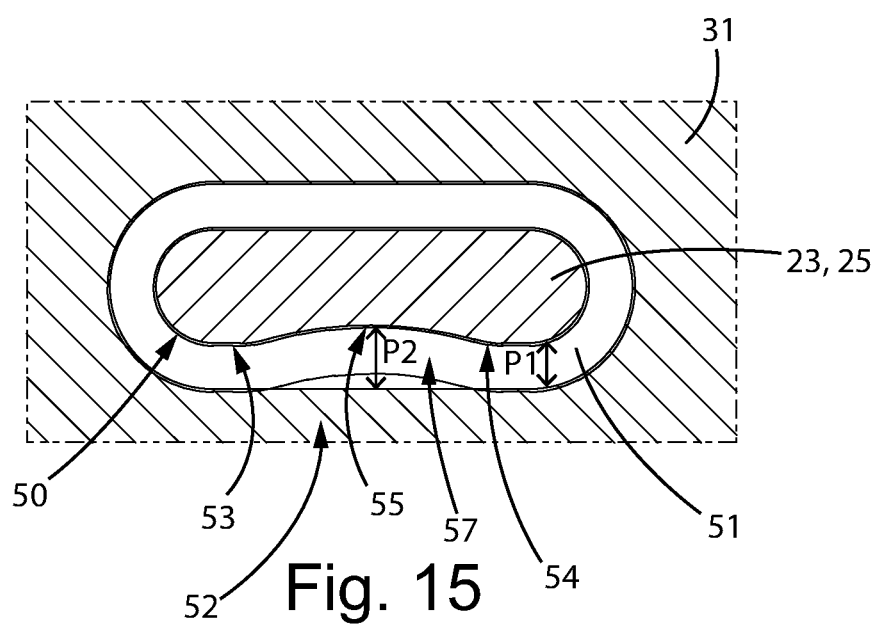

Furthermore, in the case shown there is an analogous confirmation of the peripheral groove 50 in another region 56 of the back 25 of the slider 23, but this is not necessary, as manifest from FIGS. 14, 15. The region 56 is opposed to the region 52, but this is not necessary.

In both cases shown, it is noted that the bottom of the peripheral groove 50 defines a concave plane figure in the plane of the drawing, transversal to the sliding direction X. In the present disclosure, under "concave plane figure" it is meant that at least two points of the figure are ends of a segment that is not entirely contained inside the figure.

As shown in FIGS. 9 and 10, in the fully advanced position of the slider 23, the gasket 51, mounted with adequate tension in the peripheral groove 50, is only subject to the longitudinal tensile stress. A portion 57 thereof bridges the intermediate section 55 of the peripheral groove 50 between the two aligned sections 53, 54. The entire extent of the gasket 51 contacts the inner wall of the blind hole 31, ensuring hermetic sealing.

While the slider 23 moves back, the portion 57 of the gasket 51, subject to the overpressure that is established in the blind hole 31 due to the increase in the volume occupied by the slider 23, is free to curve toward the bottom of the intermediate section 55 of the peripheral groove 50, counteracting the establishment of the overpressure itself, because a gap establishes between the gasket 51 and the inner wall of the blind hole 31.

Figure 11:
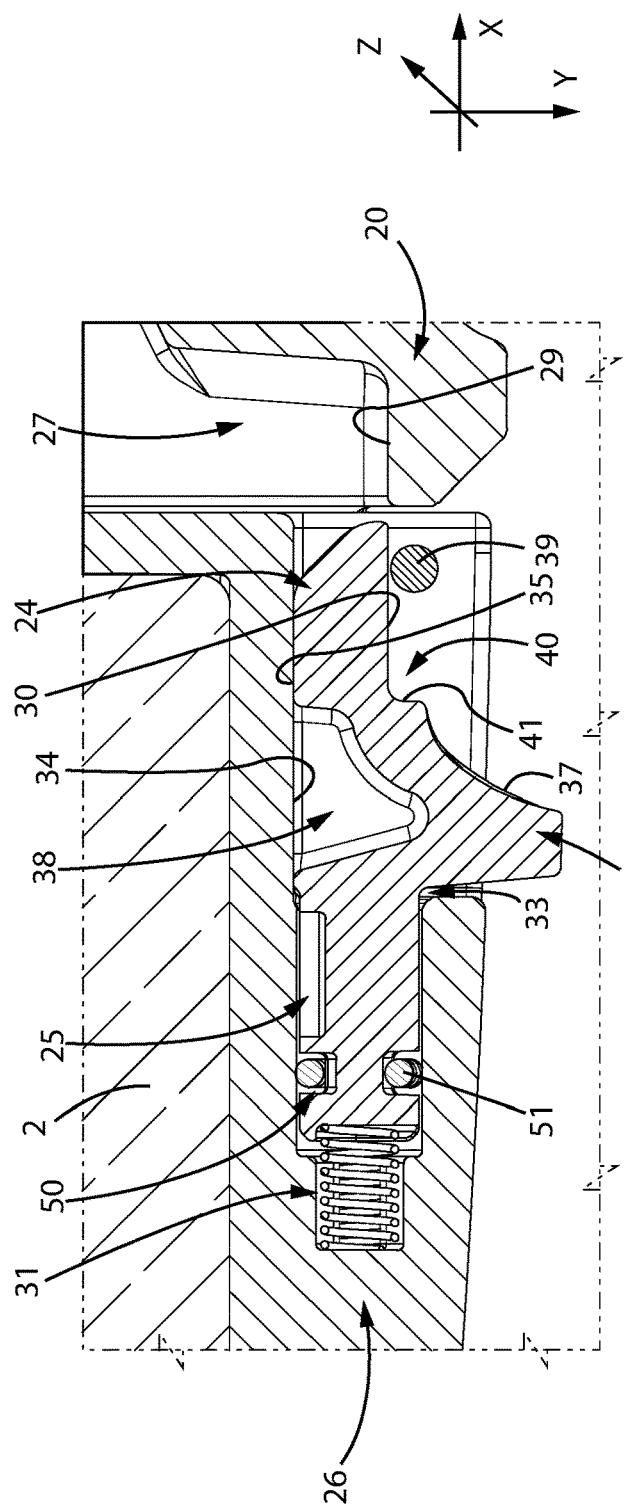
FIG. 11-13 are views corresponding to FIGS. 8-10, wherein the latch assembly is in the released condition.
Figure 12:
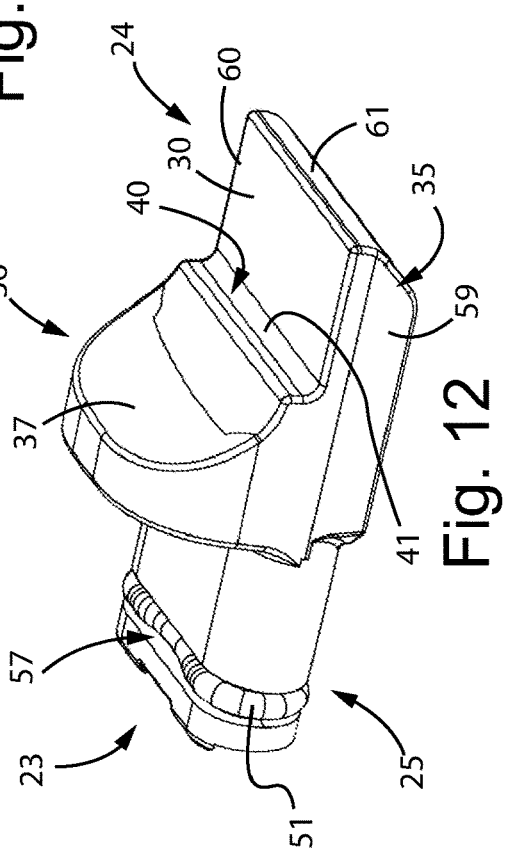

The gap 58 in the condition of maximum deformation of the gasket 51 is manifest in FIGS. 11-13 that represent the fully retracted position of the slider 23.

As a consequence, the resistance offered by the sliding seat 26 against the pushing of the slider 23 towards the backward position (in order to release the latch assembly 22 and therefore set the electric power supply unit 2 free, or allow its seating on the component 20) is not increased by the overpressure, thus requiring less physical effort with the finger.

In addition, during the push on the slider 23 in the blind hole 31 (towards the fully retracted position) said gap acts as a vent for air, favouring the expulsion of particles of dust, dirt and water that may be present in the vicinity of the mouth of the blind hole 31, hindering their entry into the blind bottom 31 itself. By avoiding that dust and dirt may jam the latch assembly 22—in particular when there are the compression springs 32—or in any case hinder its proper functioning, the sealing function of the gasket 51 is in fact enhanced.

As mentioned, the retaining seat 27 of the head 24, formed in the component 20, is effective—thanks to its abutment surface or limiter 29—to retain the electric power supply unit 2, through its first surface 30, against a displacement in the first way of the retaining direction Y (cf. the positive direction of axis Y shown in FIG. 8), in the seated state of the electric power supply unit 2 and in the latched condition of the latch assembly 22.

The retaining seat 27 may be configured to also define one or more abutment surfaces or limiters (not shown), configured to receive, in an abutment and pushing relationship, the second surface 35 of the head 24, facing toward the electric power supply unit 2 and the component 20 and sliding on the bottom 34 of the guide channel 33, and/or side surfaces 59, 60 of the head 24, so as to retain the electric power supply unit 2 against movements also in other oriented directions. In this manner the latch assembly 22 may be even more effective to firmly hold the electric power supply unit 2 on the component 20.

The retaining seat 27 may be configured to also define an abutment surface or limiter (not shown) configured to receive, in abutment and pushing relationship, the front surface 61 of the head 24, so as to prevent the exit of the slider 23 from the blind hole 31 in case of breaking of the crosspiece 39 while the battery power supply unit is seated. The front surface 61 may be slanted with respect to the insertion direction X, as shown, the slanting acting as a pilot during the seating of the head 24 in the retaining seat 27.

Alternatively, the retaining seat 27 may be oversized with respect to the head 24 along one or more of the axes X, Z, or of the negative direction of axis Y, so as to allow insertion thereof without relative sliding.

Turning back to FIGS. 1-2, in the case shown, the region 71 (FIG. 3) of the electric power supply unit 2 involved by the latch assembly 22 is intended to be the bottom one in the condition wherein the derailleur 3 is mounted on the bicycle and with the bicycle in the condition of straight travel on level ground, so that the electric power supply unit 2 is held suspended by the latch assembly 22.

In its opposed, or at least substantially opposed, region 72 (FIG. 3) the electric power supply unit 2 is supported (in case of overturning or nearly overturning of the bicycle) and held by the attachment/detachment seat 21.

In the case shown, in particular, the attachment/detachment seat 21 is configured to retain said opposed region 72 of the electric power supply unit 2 against removal from the component 20 in the opposed direction of the retaining direction (axis Y), upwards in said condition of straight travel on level ground of the bicycle and in FIG. 12, through a bracket 73.

Either one of the electric power supply unit 2 and the attachment/detachment seat 21 may comprise a cavity and/ or a protrusion having slanted pilot surfaces (not shown), to guide the correct seating of the electric power supply unit 2 in the component 20, as shown. There may also be more pilot members.

The attachment/detachment seat 21 shown has one or more sliding guide(s) 76 extended along the retaining direction Y and conformed so as to retain the electric power supply unit 2 against removal in sliding direction X and in transverse direction Z, for example through one or more undercut groove(s) 77 for accommodating a respective lug(s) 78 of the electric power supply unit 2. In the present disclosure, under "undercut" a recessed surface inaccessible when using a straight tool is meant to be indicated.

The sliding seat 76 is, however, not essential.

The attachment/detachment seat 21 may be shaped in a manner even appreciably different from what has been shown, and may support and retain the electric power supply unit 2 in a different manner and/or not in all the above mentioned directions.

Alternatively or additionally, a latch assembly analogous to the latch assembly 22 may be provided for at said region 72 of the electric power supply unit 2 substantially opposed to the region 71 involved by the latch assembly 22, and/or at other regions of the electric power supply unit 2.

The electric power supply unit 2 shown has substantially the shape of a rectangular parallelepiped, but the shape of the electric power supply unit 2 may also deviate appreciably from that shown. For example the electric power supply unit 2 may have the shape of an oblique parallelepiped or may comprise one or more concave or convex faces (or regions thereof).

The attachment/detachment seat 21 and the electric power supply unit 2 have matching electric contacts 80, 81 (FIGS. 4, 5, 16, 18) that establish the electric connection in the seated state of the electric power supply unit 2. In the case shown, four pairs of matching electric contacts 80, 81 are provided for, of which two pairs are connected to the negative pole (ground) and to the positive pole (power supply) of the secondary cells 10 of the electric power supply unit 2 and are provided to lead the power supply voltage from the electric power supply unit 2 to the user(s) provided for in the component 20, for example to the geared motor 9, and possibly for recharging the secondary cells when the electric power supply unit 2 is not seated. The other two pairs of matching electric contacts 80, 81 may be for example used for full duplex serial connection between the equipment 1 and the electric power supply unit 2, when it is of the smart battery type, provided with electronic components borne for example by the PCB 13. From the electric power supply unit 2 to the equipment 1, for example the residual charge, the number of recharge cycles made, etc., may be communicated. From the equipment 1 to the electric power supply unit 2, for example a serial number thereof, a firmware update program, a request to communicate said data, etc., may be communicated.

However, a different number of pairs of matching electric contacts 80, 81 and/or different communication type and mode may be provided for.

In the case shown, the matching electric contacts 80, 81 are provided on the bracket 73 of the attachment/detachment seat 21 and in the surface or region of the electric power supply unit 2 paired thereto, extended substantially orthogonal to the retaining direction Y, that corresponds to the seating direction of the electric power supply unit 2. However, the matching electric contacts 80, 81 may be provided on other surfaces of the attachment/detachment seat 21 and of the electric power supply unit 2 that enter into mechanical contact when the electric power supply unit 2 is seated, in particular when the seating movement of the electric power supply unit 2 is a roto-translatory one.

With reference also to FIGS. 16-19, regardless of where they are located, the matching electric contacts 80, 81 may be arranged in a protrusion 83 and a cavity or recess 84 of complementary shapes. In the case shown the protrusion 83 is made in the electric power supply unit 2 and the cavity 84 is made in the component 20, but they might be reversed.

The protrusion 83 may have a peripheral groove 85, a hermetic seal gasket 86 (FIG. 3) extending in the peripheral groove 85.

Arranging the protruding or "male" contacts in the cavity or recess 84, they are more protected also when the electric power supply unit 2 is not seated.

The "male" electric contacts, of the component 20 in the case shown by way of an example, may be of the pogo pin type.

Figure 17:
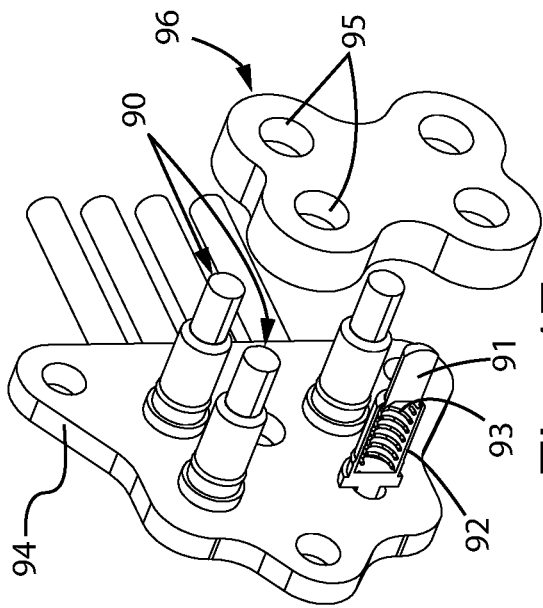
FIGS. 16-19 show some details relating to the electrical connection of the electric power supply unit to the bicycle equipment.
Figure 19:
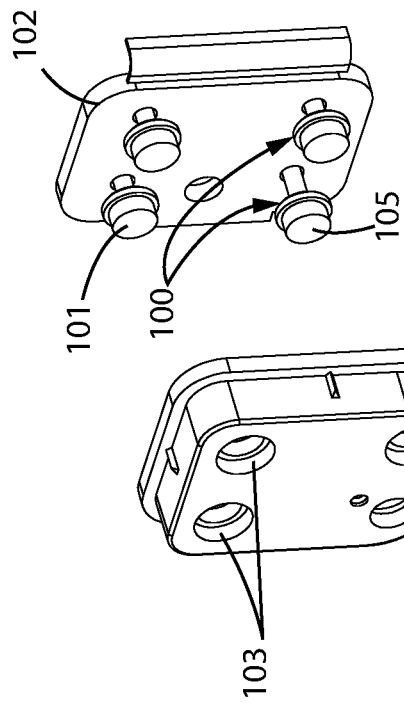
Figure 16:
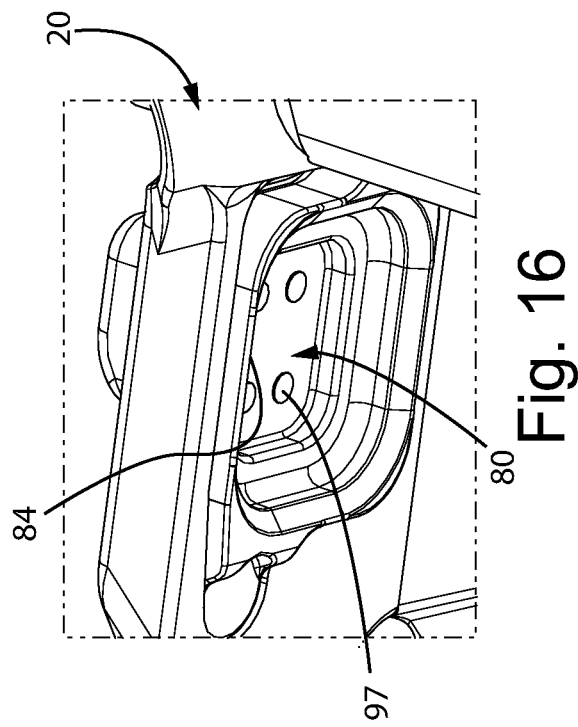
Figure 18:
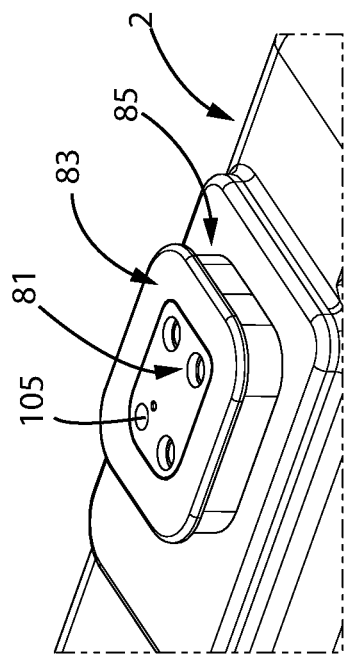

A pogo pin—see the pogo-pins 90 of which a section is schematically shown in FIG. 17—comprises a plunger 91 sliding in a blind barrel 92; the plunger 91 is forced in the position protruding from the barrel 92, outwards, by a helical spring 93. The pogo pin contacts are for example gathered on a printed circuit board or PCB 94 and the barrels 92 extend through parallel through holes 95 of an electrically insulating support 96 that may also serve as a hermetic seal. Alternatively to the PCB 94, the pogo-pin may be directly tinned to the respective electrical conductors.

The matching contact 100 (FIG. 19) of a pogo pin comprises a plane or concave plate 101 contacting the plunger 91 of the pogo pin 90. The matching contacts 100 are for example gathered on a printed circuit board or PCB 102 and extend through parallel through holes 103 of an electrically insulating support 104 that may also serve as a hermetic seal. Alternatively, the plate 101 may be directly embodied by a plated pad on the PCB 102.

These types of matching contacts 90, 100 exhibit a high resilience of the electrical connection to shocks and vibrations, counteracting intermittent losses of electrical connection.

The ground electric contact 105 ("female" or matching contact 100 of the pogo pin 90) may be more outcropping than the other electric contacts of the electric power supply unit 2 (in the illustrative case shown). In this manner, it is the first to enter into mechanical and electric contact with the respective pogo pin 97 during the movement of seating of the electric power supply unit 2, so as to protect the electronics by stabilizing the reference voltage level before the establishment of the remaining electrical connections.

Although the latch assembly 22 is shown as having the slider 23 supported by the electric power supply unit 2 and interacting with the retaining seat 27 provided on the component 20, those skilled in the art will understand, in the light of the previous description, that a dual configuration is possible, wherein the latch assembly 22 has the slider 23 supported by the component 20, and the retaining seat 27 is provided on the electric power supply unit 2.

The sliding seat 26 need not necessarily comprise a guide channel 33, which may be totally absent or replaced for example by a guide slit made in the lateral wall of the blind hole 31. The control region 36 of the slider 23 might in that case be replaced by a grip member sliding in the slit and protruding therefrom.

In any case, alternatively to the control region 36 provided with the finger resting surface 37, a different member may be provided for gripping or engaging the slider 23 and pushing it—or puling it—to bring the latch assembly 22 from the latched condition to the released condition.

The compression spring 32 might be absent or be replaced by other elastic means for urging the slider 23 towards the advanced position.

Those skilled in the art will understand that the derailleur 3 may have a shape even considerably different from that shown and/or additional components not shown for the sake of simplicity.

In the case shown, as mentioned the geared motor 9 is housed in the support body 4, differently from the attachment/detachment seat 21 for the electric power supply unit 2 that is made in the proximal connecting arm 6. In this case, there is an electric connection extended between the contacts of the attachment/detachment seat 21 and the support body 4. The geared motor 9 might be housed in still another component of the derailleur 3 or in general of the bicycle equipment 1, different from the component 20 preselected for the attachment/detachment seat 21.

Alternatively, the geared motor 9 may be housed in the or supported by the same component 20 preselected for the attachment/detachment seat 21, for example geared motor 9 and electric power supply unit may both be housed in the support body 4 of a derailleur 3.

The secondary cells of the electric power supply unit 2 may be recharged while the electric power supply unit 2 is on board of the bicycle, by providing for suitable recharge connectors, and/or the electric power supply unit 2 may be recharged in a recharge cradle after having been detached from the equipment 1, possibly exploiting the same electric contacts 81.

Although it has been described in the context of a rear derailleur 3, the invention disclosed herein, including all variants and generalisations thereof, also applies to a front derailleur.

Figure 20:
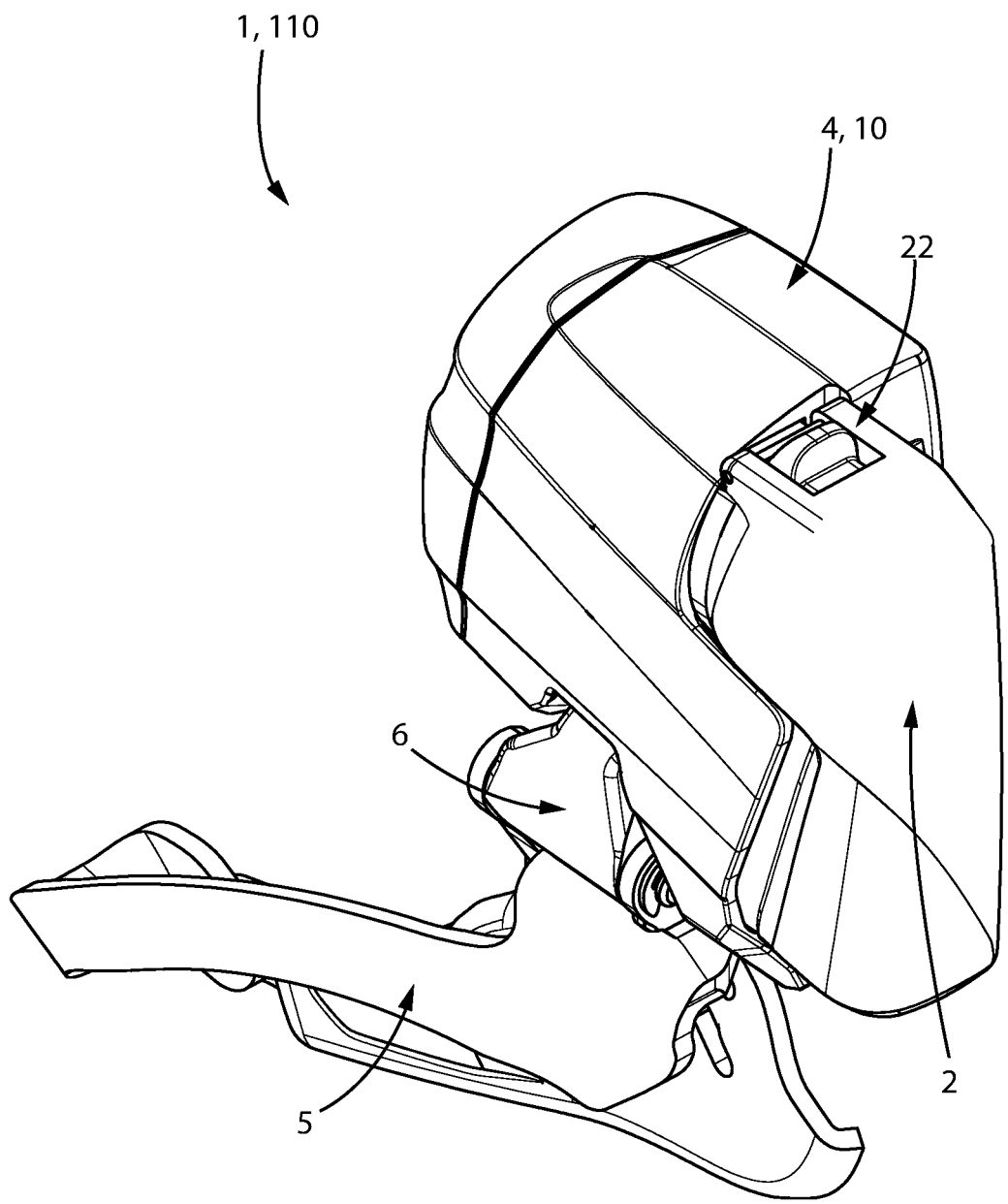
FIG. 20 is a perspective view of another bicycle equipment, with the electric power supply unit attached thereto.

Merely by way of an example, FIG. 20 shows a front derailleur 110, wherein the electric power supply unit 2 is seated and clamped. Similar numbers are used for the same members or corresponding to those used for the rear derailleur 3.

In the case of the front derailleur 110, the displacement of the chain guide 5 has at least one displacement component in the direction of the bottom bracket spindle, so as to bring the transmission chain or belt into engagement with a toothed wheel or chain ring of the crankset.

In the case of the front derailleur 110 shown, the component 10 having the seat 21 for removable attachment of the electric power supply unit 2 is the support body 4, and the geared motor 9 is, for example, also supported by the top body 4, but also in this case, different locations of the electric power supply unit 2 and of the geared motor are possible.

Furthermore, the invention disclosed herein also applies to a different electrically powered bicycle equipment, for example one of those listed in the introductory part.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. An electrically powered bicycle equipment, comprising:
    an electric power supply unit comprising one or more secondary cells,
    a component having an attachment/detachment seat for removable attachment of the electric power supply unit,
    the attachment/detachment seat and the electric power supply unit having matching electric contacts that establish electrical connection in a seated state of the electric power supply unit, and
    at least one latch assembly for retaining the electric power supply unit in the seated state, comprising a slider having a head and a back opposed to the head,
    one of the electric power supply unit and the component having a sliding seat of the slider, the other one of the electric power supply unit and the component having a retaining seat of the head against a displacement at least in a first way of a retaining direction, in the seated state of the electric power supply unit and in the latched condition of the latch assembly,
    wherein the slider is slidable in the sliding seat between a fully advanced position wherein the head protrudes from the sliding seat in order to be able to insert in the retaining seat, and a fully retracted position wherein the head does not protrude from the sliding seat,
    wherein the sliding seat comprises a blind hole, the blind hole and the back of the slider having complementary shapes in a section transverse to the sliding direction, and the blind hole being sized to accommodate the back of the slider in a sliding manner,
    wherein the back of the slider has a closed-loop peripheral groove, and wherein a ring gasket is housed taut in the peripheral groove,
    wherein in at least one region of the back of the slider, the peripheral groove has two aligned sections and an intermediate section therebetween, the intermediate section being comparatively deeper than the two aligned sections,
    whereby in the fully advanced position of the slider, a portion of the gasket bridges the intermediate section between the two aligned sections, and while the slider moves back, the portion of the gasket is free to curve towards a bottom of the intermediate section of the peripheral groove.

2. The electrically powered bicycle equipment according to claim 1, wherein the latch assembly comprises elastic means urging the slider towards the advanced position, preferably at least one compression spring housed in the blind hole and acting by pushing on the back of the slider.

3. The electrically powered bicycle equipment according to claim 1, wherein said at least one region of the back of the slider comprises two regions of the back of the slider, preferably two opposed regions.

4. The electrically powered bicycle equipment according to claim 1, wherein the back of the slider has, in cross-section, an oval shape, and said at least one region of the back of the slider is preferably comprised in at least one longest side of the oval section.

5. The electrically powered bicycle equipment according to claim 1, wherein the sliding seat further comprises a guide channel contiguous to the blind hole, the guide channel having a sliding bottom for the slider, the bottom being formed on said one of the electric power supply unit and the component, and wherein preferably the slider has a control region sliding along the guide channel.

6. The electrically powered bicycle equipment according to claim 5, wherein the control region has a finger resting surface, having a concavity towards the head of the slider.

7. The electrically powered bicycle equipment according to claim 5, wherein in the proximity of the end of the guide channel opposed to that contiguous to the blind hole, a crosspiece is provided for, the head of the slider being in sliding and/or rolling coupling with the crosspiece, wherein preferably the crosspiece is a pin, possibly pivotable about its own longitudinal axis.

8. The electrically powered bicycle equipment according to claim 5, wherein the head of the slider forms a step with the control region of the slider, a riser of the step abutting against a crosspiece in the fully advanced position of the slider.

9. The electrically powered bicycle equipment according to claim 1, wherein the retaining seat formed in said other one of the electric power supply unit and the component defines an abutment surface configured to receive, in abutment and pushing relationship, a surface of the head facing away from said one of the electric power supply unit and the component.

10. The electrically powered bicycle equipment according to claim 1, wherein the attachment/detachment seat formed on the component is configured to retain at least one region of the electric power supply unit, substantially opposed to a region involved by the latch assembly, against removal from the component at least in a second way of the retaining direction, contrary to the first way.

11. The electrically powered bicycle equipment according to claim 1, wherein the attachment/detachment seat formed on the component comprises at least one sliding guide of the electric power supply unit along the retaining direction, and/or at least one of the electric power supply unit and the attachment/detachment seat comprises at least one pilot member.

12. The electrically powered bicycle equipment according to claim 1, wherein the retaining direction is the vertical direction, and the first way is downwards in the condition wherein the bicycle equipment is mounted on the bicycle and with the bicycle in the condition of straight travel on level ground.

13. The electrically powered bicycle equipment according to claim 1, wherein the electric contacts of one and a same between the electric power supply unit and the component are of the pogo pin type and/or wherein in at least one of the electric power supply unit and the component, the ground electric contact is more outcropping than the other electric contacts.

14. The electrically powered bicycle equipment according to claim 1, wherein the bicycle equipment is a derailleur, comprising:
- a plurality of mutually movable components, comprising a support body configured to be attached to a bicycle frame, a chain guide, and a pair of connecting arms extended between the support body and the chain guide, and
- a geared motor controlling the mutual motion between chain guide and support body,
- wherein said component having the attachment/detachment seat is a preselected component of the mutually movable components.

15. The electrically powered bicycle equipment according to claim 14, wherein the derailleur is a rear derailleur and the component is a connecting arm, in particular the proximal connecting arm, or wherein the derailleur is a front derailleur and the component is the support body.

* * * * *